United States Patent
Coleman

(10) Patent No.: US 11,755,872 B2
(45) Date of Patent: Sep. 12, 2023

(54) RIGID TRANSACTION CARD

(71) Applicant: American Express Travel Related Services Company, Inc., New York, NY (US)

(72) Inventor: James Bruce Coleman, Phoenix, AZ (US)

(73) Assignee: AMERICAN EXPRESS TRAVEL RELATED SERVICES COMPANY, INC, New York, NY (US)

( * ) Notice: Subject to any disclaimer, the term of this patent is extended or adjusted under 35 U.S.C. 154(b) by 0 days.

(21) Appl. No.: 17/494,408

(22) Filed: Oct. 5, 2021

(65) Prior Publication Data

US 2023/0103318 A1    Apr. 6, 2023

(51) Int. Cl.
*G06K 19/06* (2006.01)
*G06K 19/077* (2006.01)

(52) U.S. Cl.
CPC .............. *G06K 19/07722* (2013.01)

(58) Field of Classification Search
CPC .. H01Q 1/243; H01Q 5/314; G06K 19/07749; G06K 19/07747; G06K 19/07745; G06K 19/077; G06K 19/07794; G06K 19/07722; G06K 19/07718; G06K 19/07732; G06Q 20/354; G06Q 10/0833; G06Q 20/341; G06Q 20/34; G06F 1/16; G06F 21/31
See application file for complete search history.

(56) References Cited

U.S. PATENT DOCUMENTS

| | | | |
|---|---|---|---|
| 8,725,598 B2 * | 5/2014 | Alfandary | G06Q 20/203 705/28 |
| 9,064,195 B2 * | 6/2015 | Hartwick | G06K 19/042 |
| 9,475,086 B2 * | 10/2016 | Finn | H01Q 1/2225 |
| 9,697,459 B2 * | 7/2017 | Finn | B23K 26/361 |
| 10,311,346 B2 * | 6/2019 | Herslow | G06K 19/02 |
| 10,922,602 B2 | 2/2021 | Cepress et al. | |
| 10,997,588 B2 | 5/2021 | Locke et al. | |

(Continued)

FOREIGN PATENT DOCUMENTS

| | | | | |
|---|---|---|---|---|
| CN | 211319265 U | | 8/2020 | |
| KR | 101436013 | * | 9/2014 | G06K 7/10 |

OTHER PUBLICATIONS

International Search Report and Written Opinion for PCT/US2022/077054 dated Jan. 17, 2023.

*Primary Examiner* — Daniel St Cyr
(74) *Attorney, Agent, or Firm* — Thomas Horstemeyer, LLP

(57) ABSTRACT

A transaction card can be manufactured from rigid materials, such as glass, stone, or ceramics. The transaction card can have a first rigid layer having a first external surface and a first internal surface, with a pocket within the first external surface of the first rigid layer. The transaction card can have a second rigid layer having a second external surface and a second internal surface. A binding layer can be located between the first rigid layer and the second rigid layer can affix the first rigid layer to the second internal layer. An integrated circuit chip can be affixed within the pocket of the first rigid layer. A rim can extend from the first external surface of first rigid layer around a first edge of the first rigid layer and a second edge of the second rigid layer and onto the second external surface of the second rigid layer.

13 Claims, 18 Drawing Sheets

(56) References Cited

U.S. PATENT DOCUMENTS

| | | |
|---|---|---|
| 11,347,993 B2 | 5/2022 | Finn |
| 11,521,035 B2 | 12/2022 | Herslow et al. |
| 2013/0344298 A1* | 12/2013 | Haas .................... B42D 25/309 524/106 |
| 2019/0303917 A1 | 10/2019 | Locke et al. |
| 2019/0311238 A1 | 10/2019 | Cepress et al. |
| 2020/0184303 A1 | 6/2020 | Herslow et al. |
| 2021/0073608 A1 | 3/2021 | Finn |

* cited by examiner

RIGID TRANSACTION CARD

BACKGROUND

Transaction cards are used for payments in a wide variety of situations. For transaction accounts targeting the upscale or luxury market, companies may offer transaction cards manufactured from non-traditional materials or that have a non-traditional design. This allows for marketing and promoting the transaction account as a premiere or luxury service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for creating a transaction card using multiple layers of rigid materials. The transaction card can be assembled from a number of layers of rigid materials. These layers can be bound together using a binder or other binding material (e.g., glue, cement, or other adhesive). The edges of the transaction card can be enveloped by a rim, such as a metallic band. The binder material and the metallic band can provide structural integrity should one or more of the layers of rigid materials fracture, crack, or splinter. The rim or metallic band can also protect the layers of rigid materials from fracturing, cracking, or splintering in response to an impact (e.g., if the transaction card were to fall and land on its edge on a hard surface).

In the following discussion, a general description of a transaction card and a method for manufacturing the same is provided. Although the following discussion provides illustrative examples of the various embodiments of the present disclosure, the use of the following illustrative examples does not exclude other implementations that are consistent with the principals disclosed.

Figure 1:
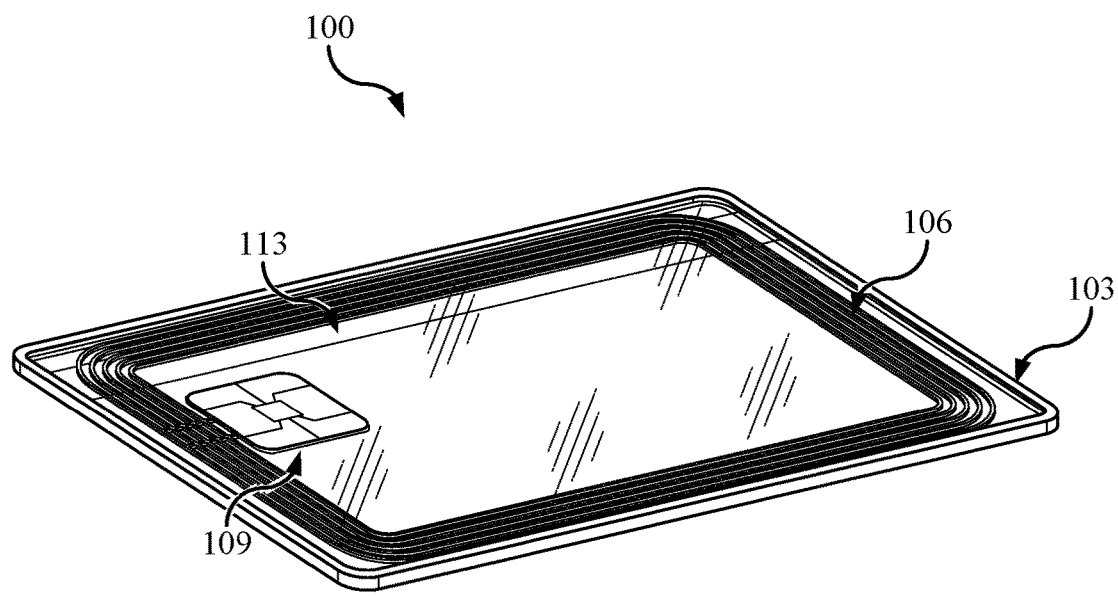
FIG. 1 depicts an example of an assembled transaction card according to various embodiments of the present disclosure.

FIG. 1 depicts an example of an assembled transaction card 100 according to various embodiments of the present disclosure. In this example, the transaction card 100 is made of several transparent layers, allowing for one to see through the body of the transaction card 100. The transaction card 100 can have a rim 103 along the edge of the transaction card 100, which can help prevent the transaction card from cracking or shattering if it is dropped or falls onto a solid surface. The rim 103 can also provide additional structural integrity to the transaction card 100 by holding the layers of the transaction card 100 together. The transaction card 100 can also include an antenna 106, a processing chip 109, and/or a magnetic stripe 113.

The antenna 106 can be used to provide wireless communications between the processing chip 109 and a contactless payment terminal. The antenna 106 can also be used to provide power to the processing chip 109 from the payment terminal. In some implementations, the antenna 106 an be physically coupled to the processing chip 109, while in other implementations, the antenna 106 can be inductively coupled to the processing chip 109. Although depicted separately from the processing chip 109, in some implementations the antenna can be included in or integrated within the processing chip 109 to form a single unit.

The processing chip 109 can represent any integrated circuit chip that can be used for securing or processing payments using the transaction card 100. Examples of processing chips 109 include integrated circuit chips that implement various versions of the Europay, Mastercard, and VISA (EMV) standard for smart payment cards. In some implementations, the processing chip 109 is coupled to an antenna 106 to provide contactless payment using near-field communication (NFC), ultrawide band (UWB) or similar low-power, short-range wireless communications standards. However, in other implementations, the processing chip 109 can include an integrated antenna 106.

The magnetic stripe 113 can include any band of magnetic material capable of storing data. Data stored on the magnetic stripe 113 can include information such as an account number of a payment account associated with the transaction card 100, the expiration date of the payment account, a card verification value (CVV) or card verification code (CSC), a service code, etc.

Figure 2:
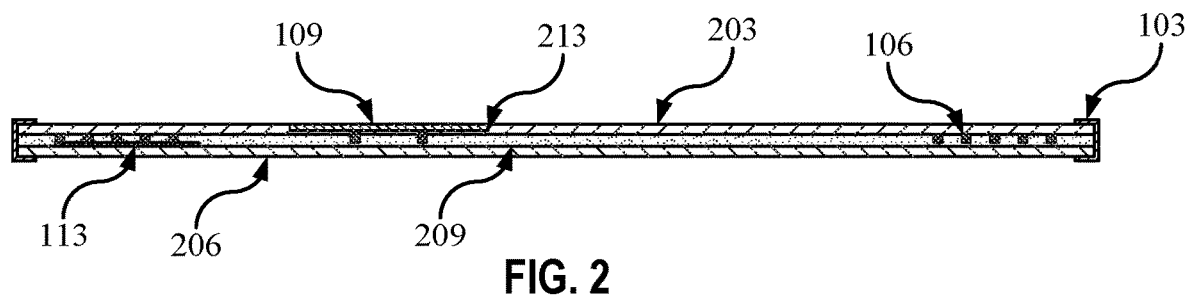
FIG. 2 depicts a cross-section view of the transaction card according to various embodiments of the present disclosure

FIG. 2 depicts a cross-section view of the transaction card 100, according to various embodiments of the present disclosure. In this cross-section view, a number of layers are depicted. These layers can include an upper rigid layer 203 and a lower rigid layer 206. A binding layer 209 sits between the upper rigid layer 203 and the lower rigid layer 206. The processing chip 109 sits within a pocket 213 on the exterior surface of the upper rigid layer 203, such that the surface of the processing chip 109 is flush with the surface of the upper rigid layer 203. The processing chip 109 can be secured within the pocket 213 using any suitable adhesive. The antenna 106 and the magnetic stripe 113 can sit within the binding layer 209 between the upper rigid layer 203 and the lower rigid layer 206.

The upper rigid layer 203 and the lower rigid layer 206 can be formed from a number of rigid materials. For example, the upper rigid layer 203 or the lower rigid layer 206 could be formed from a chemically strengthened glass that has increased strength as a result of a post-production process. Examples of chemically strengthened glasses include glasses marketed under the GORILLA GLASS® trademark, an alkali-aluminosilicate glasses, etc. The use of the chemically strengthened glasses, when combined with a transparent translucent binding layer 209, allow for transparent or translucent transaction cards 100 to be manufactured. As another example, the upper rigid layer 203 or the lower rigid layer 206 could be formed from a ceramic material, including transparent ceramic materials such as aluminum oxynitride, also known as transparent aluminum. In some implementations, the upper rigid layer 203 or the lower rigid layer 206 could be formed from stone, such as black onyx, red onyx, or other stones.

The binding layer 209 is a layer containing a binding medium that binds the upper rigid layer 203 to the lower rigid layer 206. The binding layer 209 can use any suitable binding medium. Examples of binding mediums include various types of adhesives, such as glues, laminates, cements, etc. Some binding mediums could be preferred for particular configurations. For example, if a transparent or translucent transaction card 100 is being manufactured using transparent or translucent materials for the upper rigid layer 203 and the lower rigid layer 206, then a transparent or translucent glue, glue laminate, or other adhesive or binding medium could be used. If opaque materials are used for the upper rigid layer 203 or the lower rigid layer 206, then other binding mediums could be used for the binding layer 209.

The position of the binding layer 209 between the upper rigid layer 203 and the lower rigid layer 206 provides additional structural integrity to the transaction card 100. If the transaction card 100 were constructed from a single rigid layer, and the single rigid layer were to crack, shatter, or splinter, then the transaction card 100 could separate into multiple pieces. If this were to occur in a person's hand, wallet, or pocket, such separation could pose a safety hazard by cutting the individual. Placing a binding layer 209 between the upper rigid layer 203 and the lower rigid layer 206 allows for the card to remain whole even if the upper rigid layer 203 or the lower rigid layer 206 were to be damaged. For example, rather than shattering, the upper rigid layer 203 or lower rigid layer 206 would crack but remain adhered to the binding layer 209.

As shown in the cross-section view of FIG. 2, the rim 103 extends from the exterior surface of the upper rigid layer 203 around the edge of the transaction card 100 to the exterior surface of the lower rigid layer 206. As a result, the rim 103 acts like a clamp to hold the upper rigid layer 203 and the lower rigid layer 206, preventing the upper rigid layer 203 and the lower rigid layer 206 from separating from the transaction card 100 in the event that the binding medium of the binding layer 209 fails, which could occur due to wear and tear over the life of the transaction card 100. Moreover, the rim 103 acts as a shock absorber in the event that the transaction card 100 is dropped or otherwise falls and strikes a surface with its edge, thereby preventing the upper rigid layer 203 or the lower rigid layer 206 from shattering or cracking due to the impact.

Figure 3:
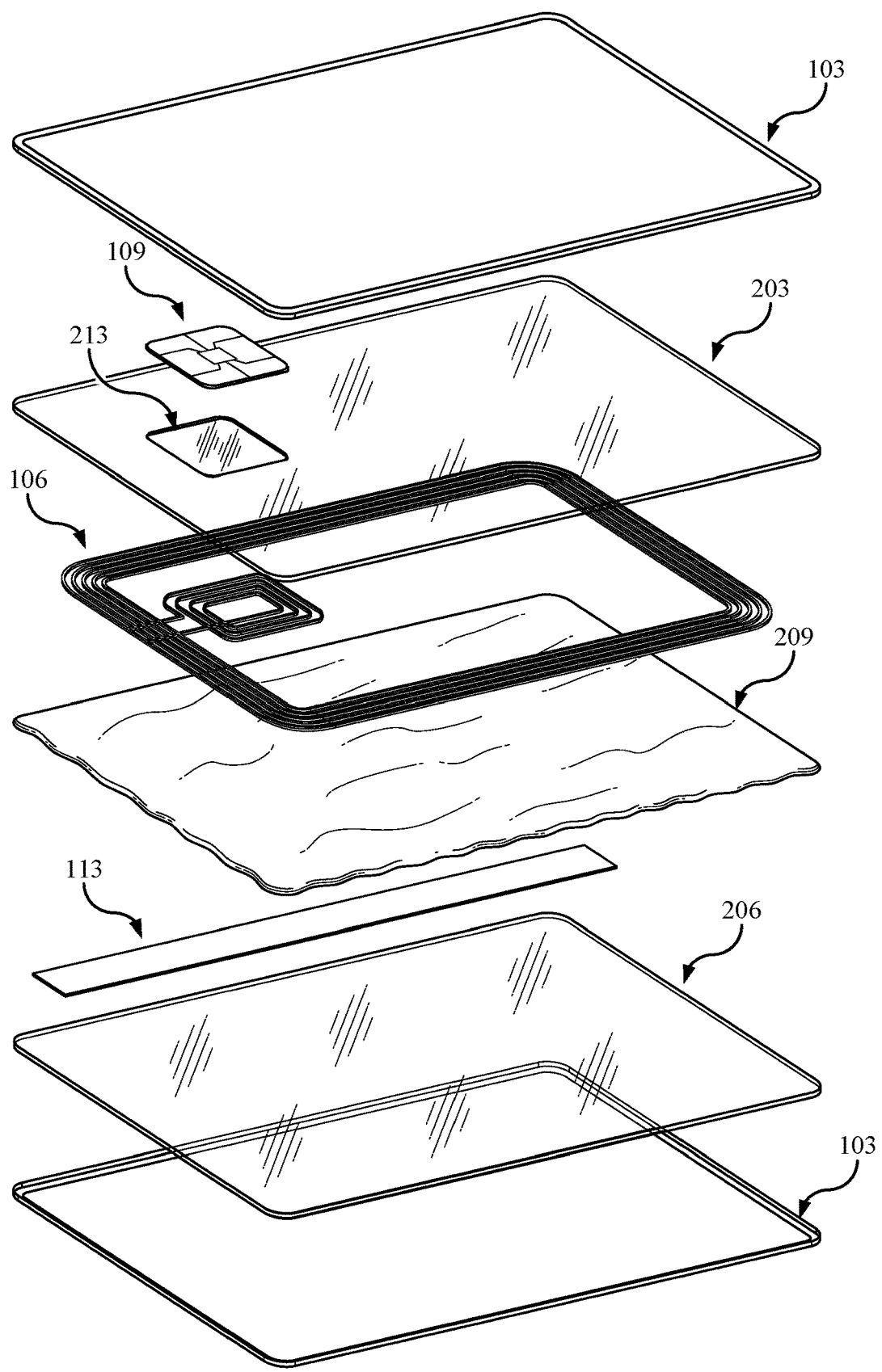
FIG. 3 depicts an exploded view of one example arrangement of the transaction card.

FIG. 3 depicts an exploded view of one example arrangement of the transaction card 100. Starting at the top of FIG. 3 and proceeding to the bottom, a processing chip 109 is shown as being placed within a pocket 213 on the exterior surface of a upper rigid layer 203. The processing chip 109 can be secured within the pocket 213 using any suitable adhesive. The antenna 106 can be placed below the upper rigid layer 203. The antenna 106 can include a coil below the processing chip 109, causing the antenna 106 to be inductively coupled to the processing chip 109. The binding layer 209 is located beneath the upper rigid layer 203 and the antenna 106. The magnetic stripe 113 can be placed beneath the binding layer 209. At the bottom is the lower rigid layer 206. Encompassing the upper rigid layer 203 and the lower rigid layer 206 is the rim 103. Although the rim 103 is depicted as two portions for illustrative purposes, it is understood that the rim 103 is a single piece as depicted in the cross-section view of FIG. 2.

Figure 4:
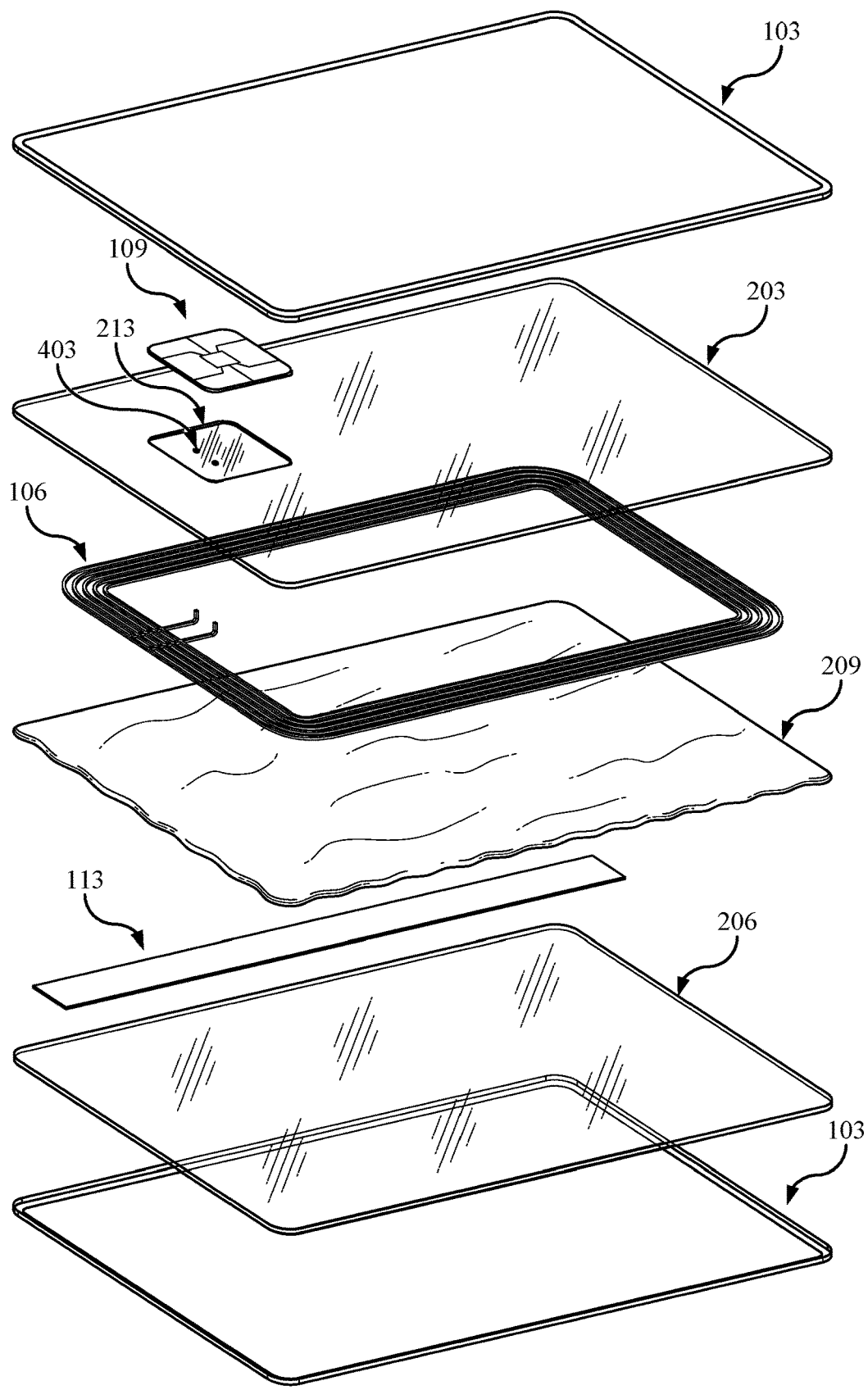
FIG. 4 depicts an exploded view of one example arrangement of the transaction card.

FIG. 4 depicts an exploded view of another example arrangement of the transaction card 100. Starting at the top of FIG. 4 and proceeding to the bottom, a processing chip 109 is shown as being placed within a pocket 213 on the exterior surface of a upper rigid layer 203. The processing chip 109 can be secured within the pocket 213 using any suitable adhesive. The bottom of the pocket 213 of the upper rigid layer 203 can have a plurality of holes 403. The antenna 106 can be placed below the upper rigid layer 203. The antenna 106 can be physically coupled to the processing chip 109 by passing a wire through individual ones of the holes 403 located at the bottom of the pocket. The binding layer 209 is located beneath the upper rigid layer 203 and the antenna 106. The magnetic stripe 113 can be placed beneath the binding layer 209. At the bottom is the lower rigid layer 206. Encompassing the upper rigid layer 203 and the lower rigid layer 206 is the rim 103. Although the rim 103 is depicted as two portions for illustrative purposes, it is understood that the rim 103 is a single piece as depicted in the cross-section view of FIG. 2.

Figure 5:
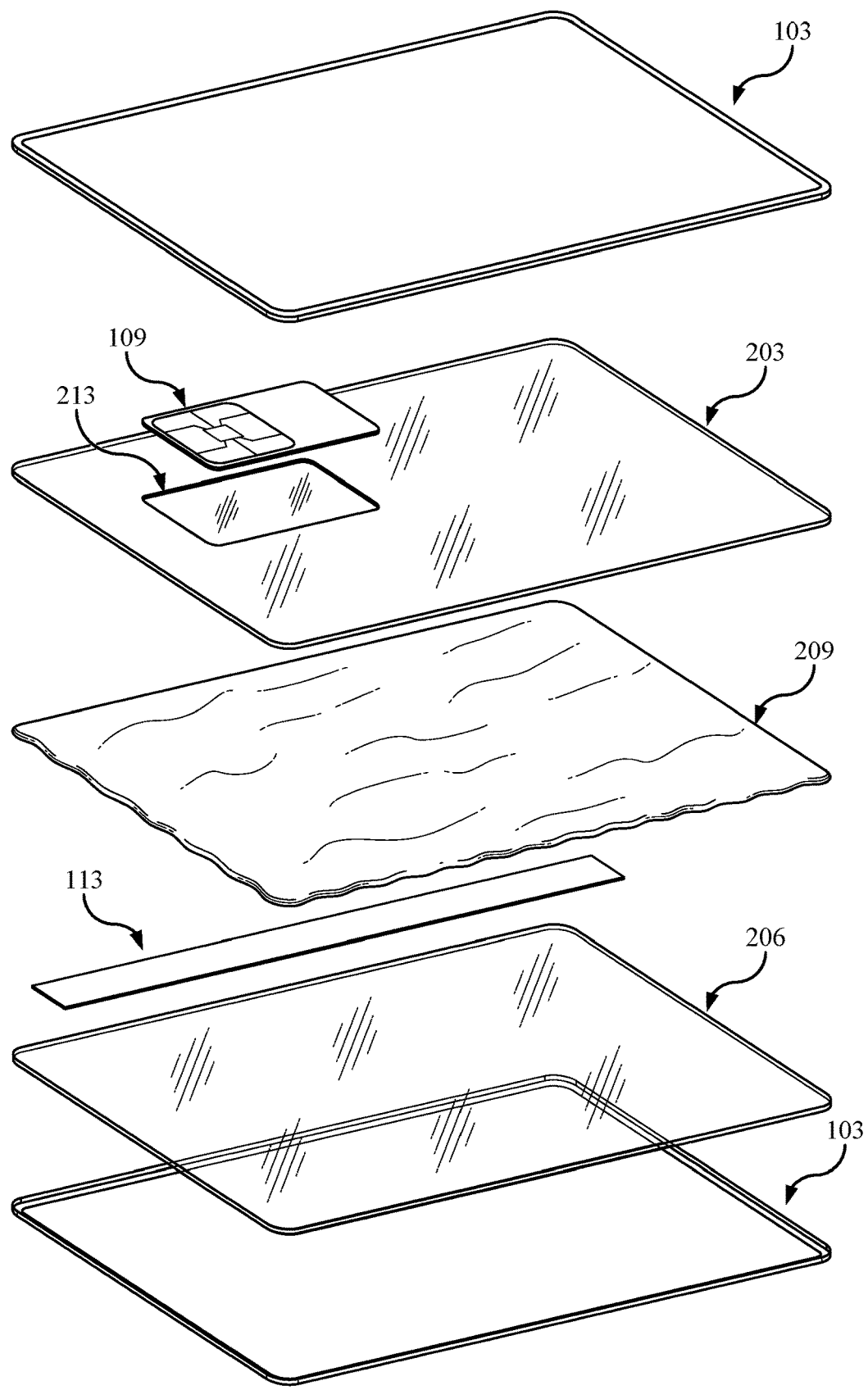
FIG. 5 depicts an exploded view of one example arrangement of the transaction card.

FIG. 5 depicts an exploded view of another example arrangement of the transaction card 100. Starting at the top of FIG. 5 and proceeding to the bottom, a processing chip 109 is shown as being placed within a pocket 213 on the exterior surface of a upper rigid layer 203. The processing chip 109 can be secured within the pocket 213 using any suitable adhesive. In contrast to the examples depicted in FIGS. 3 and 4, an antenna is not placed beneath the upper rigid layer 203. In examples such as those depicted in FIG. 5, the processing chip 109 can include an integrated antenna 106. The binding layer 209 is located beneath the upper rigid layer 203 and the antenna 106. The magnetic stripe 113 can be placed beneath the binding layer 209. At the bottom is the lower rigid layer 206. Encompassing the upper rigid layer 203 and the lower rigid layer 206 is the rim 103. Although the rim 103 is depicted as two portions for illustrative purposes, it is understood that the rim 103 is a single piece as depicted in the cross-section view of FIG. 2.

Figure 6:
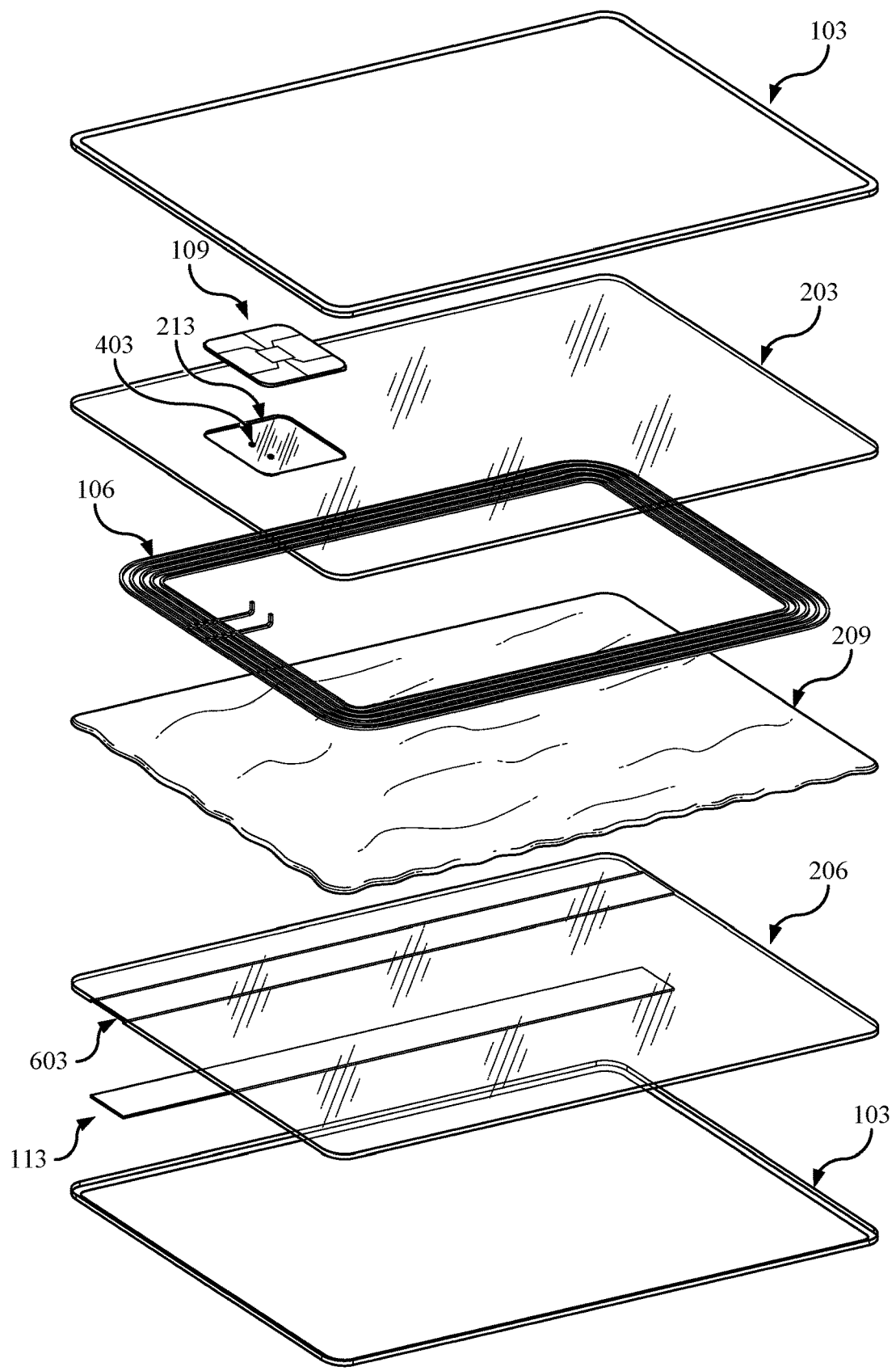
FIG. 6 depicts an exploded view of one example arrangement of the transaction card.

FIG. 6 depicts an exploded view of another example arrangement of the transaction card 100. Starting at the top of FIG. 6 and proceeding to the bottom, a processing chip 109 is shown as being placed within a pocket 213 on the exterior surface of a upper rigid layer 203. The processing chip 109 can be secured within the pocket 213 using any suitable adhesive. The bottom of the pocket 213 of the upper rigid layer 203 can have a plurality of holes 403. The antenna 106 can be placed below the upper rigid layer 203. The antenna 106 can be physically coupled to the processing chip 109 by passing a wire through individual ones of the holes 403 located at the bottom of the pocket. The binding layer 209 is located beneath the upper rigid layer 203 and the antenna 106. Beneath binding layer 209 is the lower rigid layer 206. The magnetic stripe 113 can be placed on the exterior surface of the lower rigid layer 206. In some implementations, the exterior surface of the lower rigid layer 206 can include a channel 603. In these implementations, the magnetic stripe 113 can rest within the channel 603 so that the surface of the magnetic stripe 113 is flush with the exterior surface of the lower rigid layer 206. Encompassing the upper rigid layer 203 and the lower rigid layer 206 is the rim 103. Although the rim 103 is depicted as two portions for illustrative purposes, it is understood that the rim 103 is a single piece as depicted in the cross-section view of FIG. 2.

Although FIGS. 3-6 depict examples of implementations according to the various embodiments of the present disclosure, other arrangements are included within the scope of this disclosure. For example, the implementations depicted in FIG. 3 or FIG. 5 could be modified to place the magnetic stripe 113 on the exterior of the transaction card 100 instead of between the upper rigid layer 203 and the lower rigid layer 206. As another example, the relative positions of the magnetic stripe 113, the antenna 106, and the binding layer 209 between the upper rigid layer 203 and the lower rigid layer 206 could be switched without impacting the functionality of the various embodiments of the present disclosure.

Figure 7:
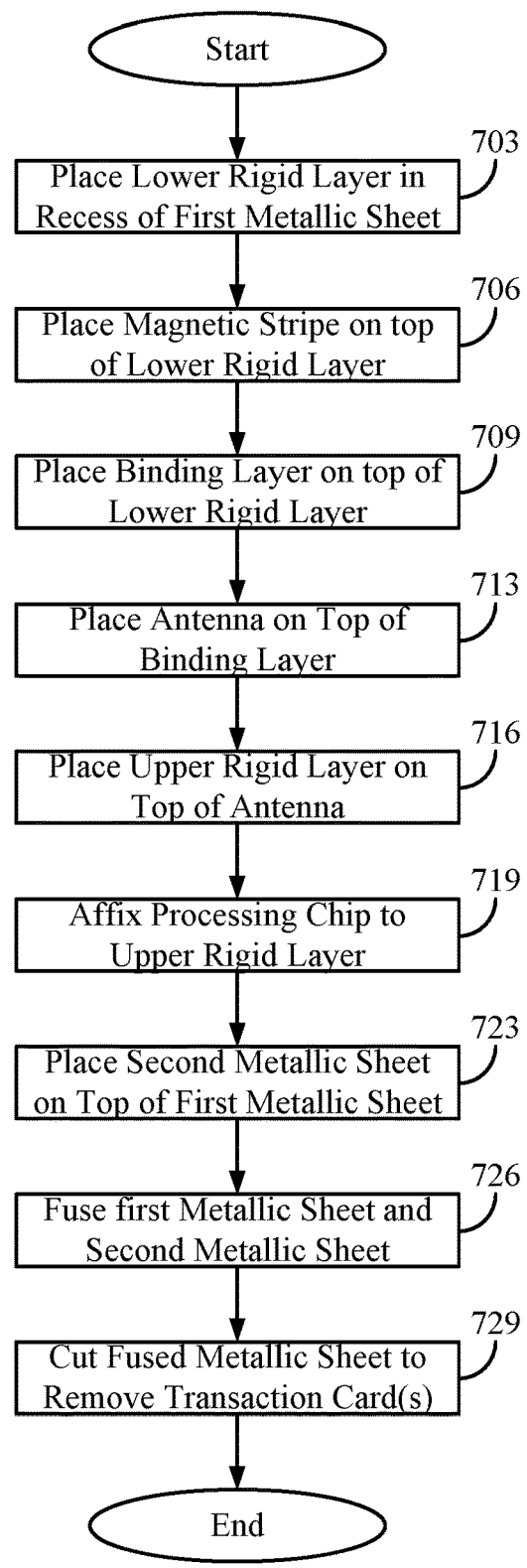
FIG. 7 is a flowchart that provides an example of the process for manufacturing a transaction card according to various embodiments of the present disclosure

Referring next to FIG. 7, shown is a flowchart that provides an example of the process for manufacturing a transaction card 100 according to various embodiments of the present disclosure. Although the flowchart of FIG. 7 shows an example sequence of actions, it is understood that the order of actions can differ from that which is depicted. For example, the actions depicted by two or more blocks shown in succession can be performed concurrently or with partial concurrence. As another example, the actions depicted by two or more blocks can be performed in alternative sequences compared to what is depicted. Further, in some embodiments, one or more of the blocks shown in the flowchart of FIG. 7 can be skipped or omitted. It is understood that all such variations are within the scope of the present disclosure.

Beginning at block 703, the lower rigid layer 206 of a transaction card 100 can be placed within a first recess of a first metallic sheet. The metallic sheet can have a plurality of recesses according to various embodiments of the present disclosure, allowing for the transaction card 100 to be massed produced in an assembly line.

Next, at block 706, a magnetic stripe 113 can be placed on top of the lower rigid layer 206 of the transaction card 100. In some implementations, the magnetic stripe 113 can be affixed to the lower rigid layer 206 using an adhesive. In other implementations, the magnetic stripe 113 can have an adhesive backing, causing the magnetic strip 113 to be self-adhering when placed in contact with the lower rigid layer 206. In some implementations, the placement of the magnetic stripe 113 could be omitted (e.g., for embodiments of a transaction card 100 that are not manufactured to include the magnetic stripe 113).

Then, at block 709, a binding layer 209 can be placed on top of the lower rigid layer 206. The binding medium that forms the binding layer 209 can be deposited using any number of approaches. For example, a glue or similar adhesive could be sprayed on the lower rigid layer 206. As another example, an adhesive sheet could be laid on top of the lower rigid layer 206.

Moving on to block 713, an antenna 106 can be placed on top of the binding layer 209. This step can be omitted in those embodiments that use a processing chip 109 that includes an integrated antenna 106. Moreover, the placement of the antenna at block 713 could occur earlier. For example, the magnetic strip 113 and the antenna 106 could be placed between the lower rigid layer 206 and the binding layer 209.

Proceeding to block 716, an upper rigid layer 203 can be placed on top of the antenna 106 and/or the binding layer 209. For example, if antenna 109 were not placed on top of the binding layer 209 at block 713 (e.g., because a processing chip 109 with an integrated antenna 106 were being used), then the upper rigid layer 203 could be placed directly on top of the binding layer 209. As another example, if the antenna 109 were placed underneath binding layer 209, then the upper rigid layer 203 could be placed directly on top of the binding layer 209. However, if an antenna 109 were previously placed on top of the binding layer 209, then the portions of the upper rigid layer 203 would be in contact with the antenna 106 while other portions of the upper rigid layer 203 would be in contact with the binding layer 209, resulting in the upper rigid layer 203 being placed on top of both the antenna 106 and the binding layer 209.

Then, at block 719, a processing chip 109 can be affixed to the upper rigid layer 203. For example, an adhesive could be deposited in the pocket 213 of the upper rigid layer 203. The processing chip 109 could then be placed in the pocket 213. The adhesive in the pocket 213 could then cause the processing chip 109 to become affixed to the upper rigid layer 203. In some implementations, placement of the processing chip 109 could occur before the fusion of the first metallic sheet with the second metallic sheet in order to improve the adherence of the processing chip 109 to the upper rigid layer 203 or to cause the processing chip 109 to adhere to the upper rigid layer 203. However, in other implementations, affixing the processing chip 109 to the upper rigid layer 203 can occur after the first metallic sheet is fused to the second metallic sheet.

Next, at block 723, a second metallic sheet can be placed on top of the first metallic sheet, the second metallic sheet having a respective second recess to the first recess of the first metallic sheet. As discussed later, the first metallic sheet and the second metallic sheet can be fused together to form the rim 103 of the transaction card 100 that encompasses all of the layers of the transaction card 100.

Referring next to block 726, the first metallic sheet and the second metallic sheet can be fused together to form a fused metallic sheet. For example, heat and pressure could be used to fuse the two metallic sheets together. The heat and pressure used to fuse the two metallic sheets together can also cause the binding medium of the binding layer 209 to adhere the upper rigid layer 203 to the lower rigid layer 206 in those implementations that use a heat or pressure activated binding medium.

Subsequently, at block 729, the fused metallic sheet can be cut along the edges of the recess to remove the transaction card 100 while leaving the rim 103 formed from fusing the metallic sheets at block 726. Cutting can be performed using a wide variety of tools, including die cutters, laser cutters, rotary cutters, etc. Once the transaction card 100 is cut from the metallic sheet, it can be engraved or embossed as desired by the issuer of the transaction card 100.

Figure 8A:
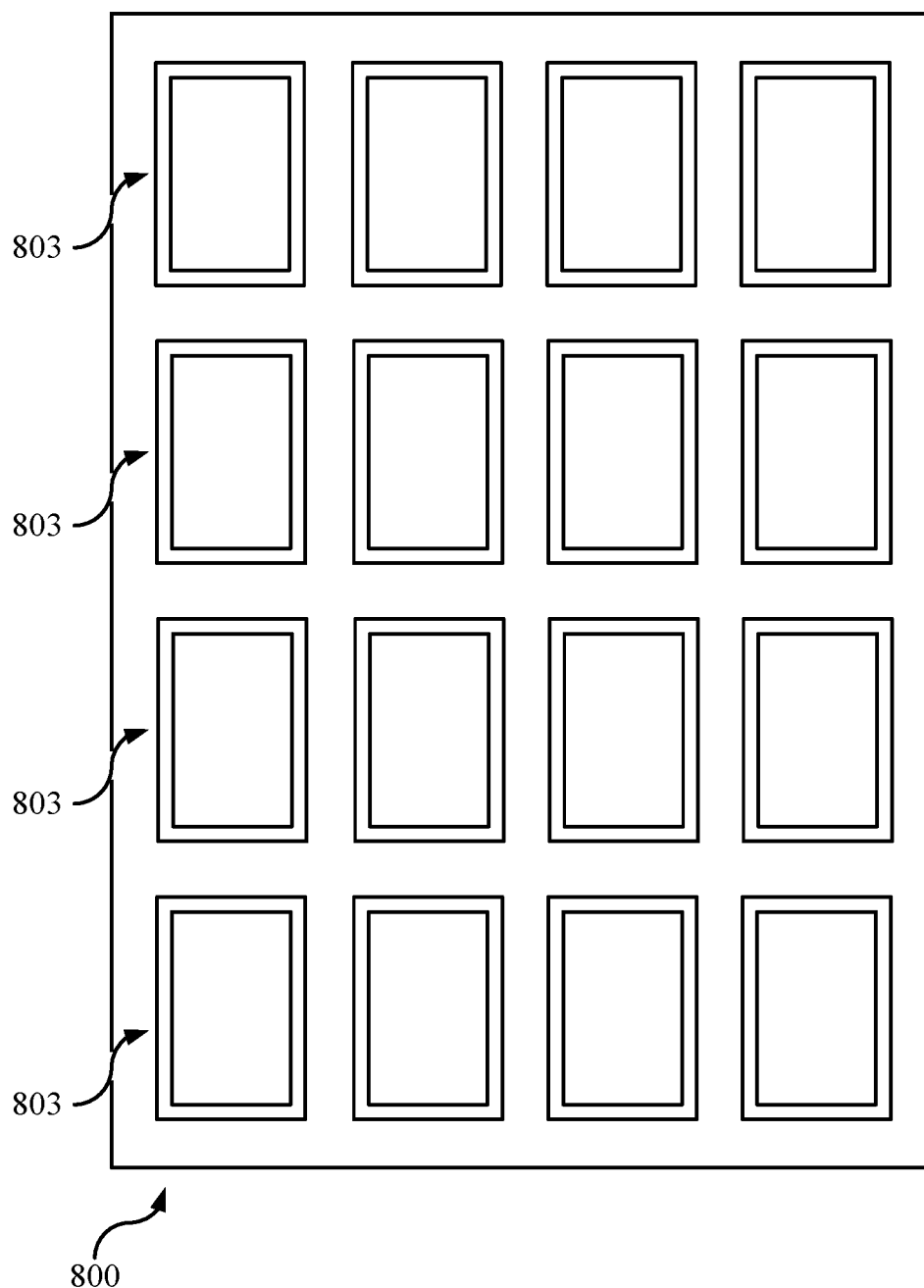
FIG. 8A and 8B depict examples of a metallic sheet used in the manufacturing process described by the flowchart of FIG. 7

FIG. 8A depicts an example of a metallic sheet 800 used in the manufacturing process described by the flowchart of FIG. 7. As shown, the metallic sheet 800 can include one or more recesses 803. Each recess 803 matches the shape and dimensions of the upper rigid layer 203 and/or lower rigid layer 206 of the transaction card 100. Each recess 803 also has a lip 806 that extends over the exterior surface of the upper rigid layer 203 and/or lower rigid layer 206 when the upper rigid layer 203 or lower rigid layer 206 is placed within the recess 803. The bottom of the recess 803 can form a hollow cavity or opening.

Figure 8B:
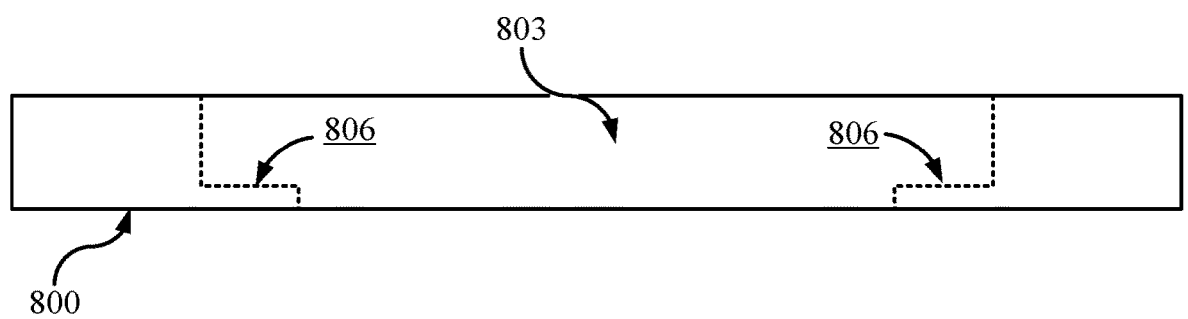

FIG. 8B depicts a second view of the metallic sheet 800 used in the manufacturing process described by the flowchart of FIG. 7. Here, a partial cross-section showing a recess 803 of the metallic sheet 800 is depicted according to various embodiments of the present disclosure. As shown, a recess 803 matches the shape and dimensions of the upper rigid layer 203 and/or lower rigid layer 206 of the transaction card 100. The recess 803 also has a lip 806 that extends over the exterior surface of the upper rigid layer 203 and/or lower rigid layer 206 when the upper rigid layer 203 or lower rigid layer 206 is placed within the recess 803. The bottom of the recess 803 can form a hollow cavity or opening.

FIGS. 9A-9J provide a graphical illustration of the individual portions of the manufacturing process described by the flowchart of FIG. 7 using the metallic sheets 800 illustrated in FIGS. 8A and 8B to produce a transaction card 100.

Figure 9A:
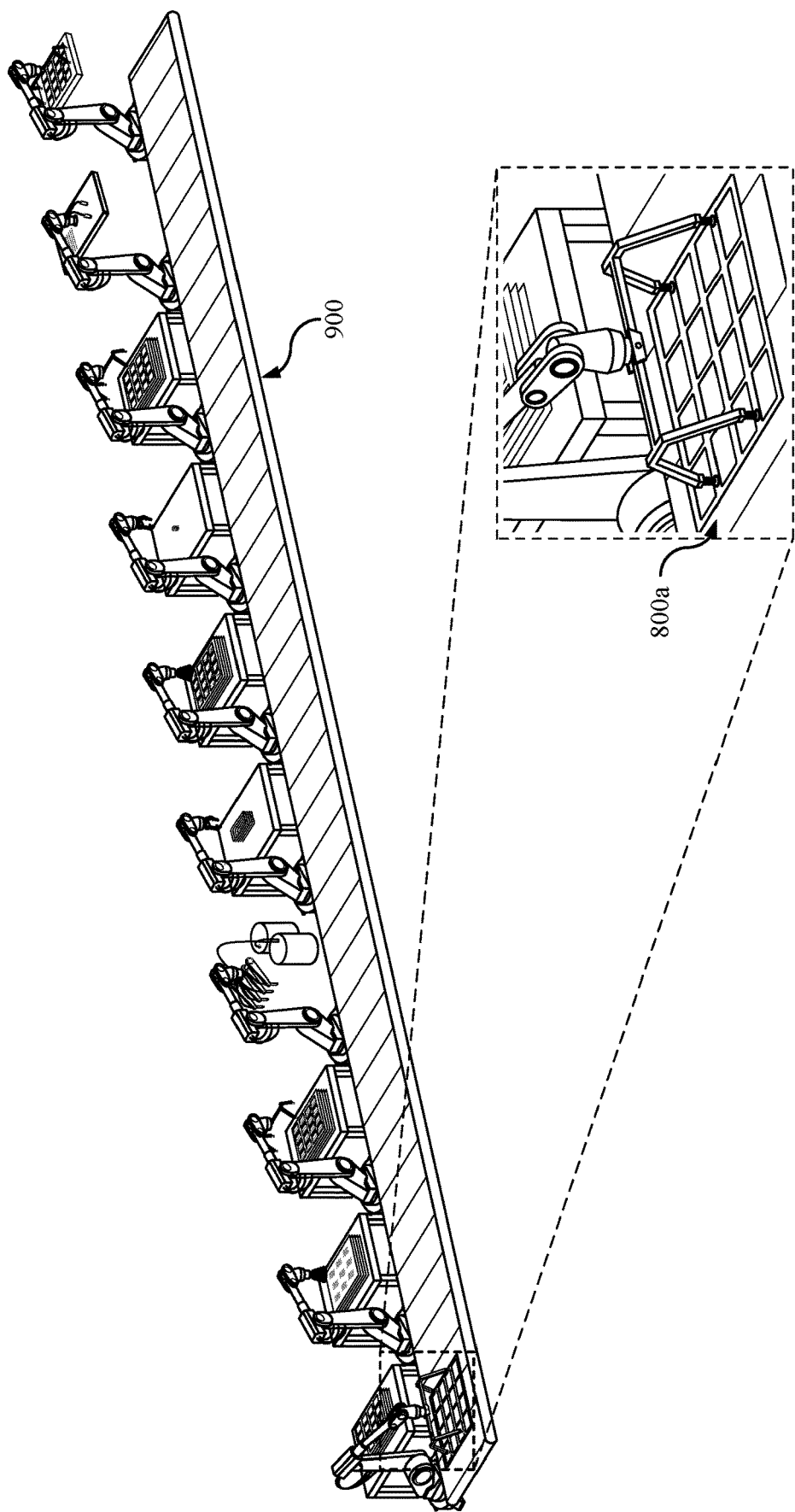
FIGS. 9A-J provide a graphical illustration of the individual portions of the manufacturing process described by the flowchart of FIG. 7 using the metallic sheets illustrated in FIGS. 8A and 8B.

FIG. 9A shows a first metallic sheet 800a being placed on a conveyor belt 900 of an assembly line in an example embodiment of the present disclosure. As shown, an industrial robot or machine can place the metallic sheet 800a on the conveyor belt 900 of the assembly line.

Figure 9B:
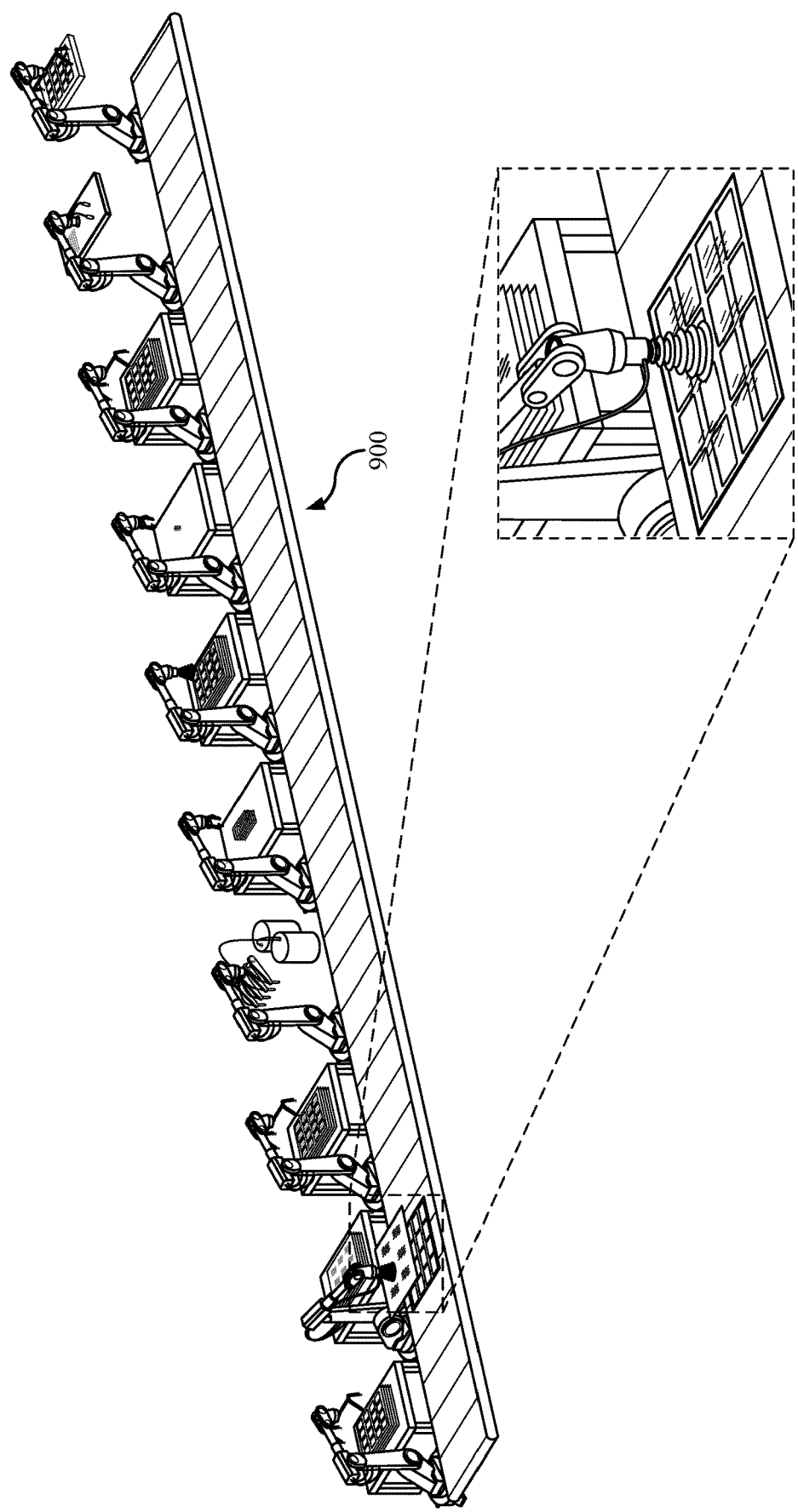

FIG. 9B illustrates an example approach for placing the lower rigid layer 206 within the recess 803 of a first metallic sheet 800, as previously described at block 703 of FIG. 7. As shown, an industrial robot or machine can place individual lower rigid layers 206 in each recess 803 of the first metallic sheet 800.

Figure 9C:
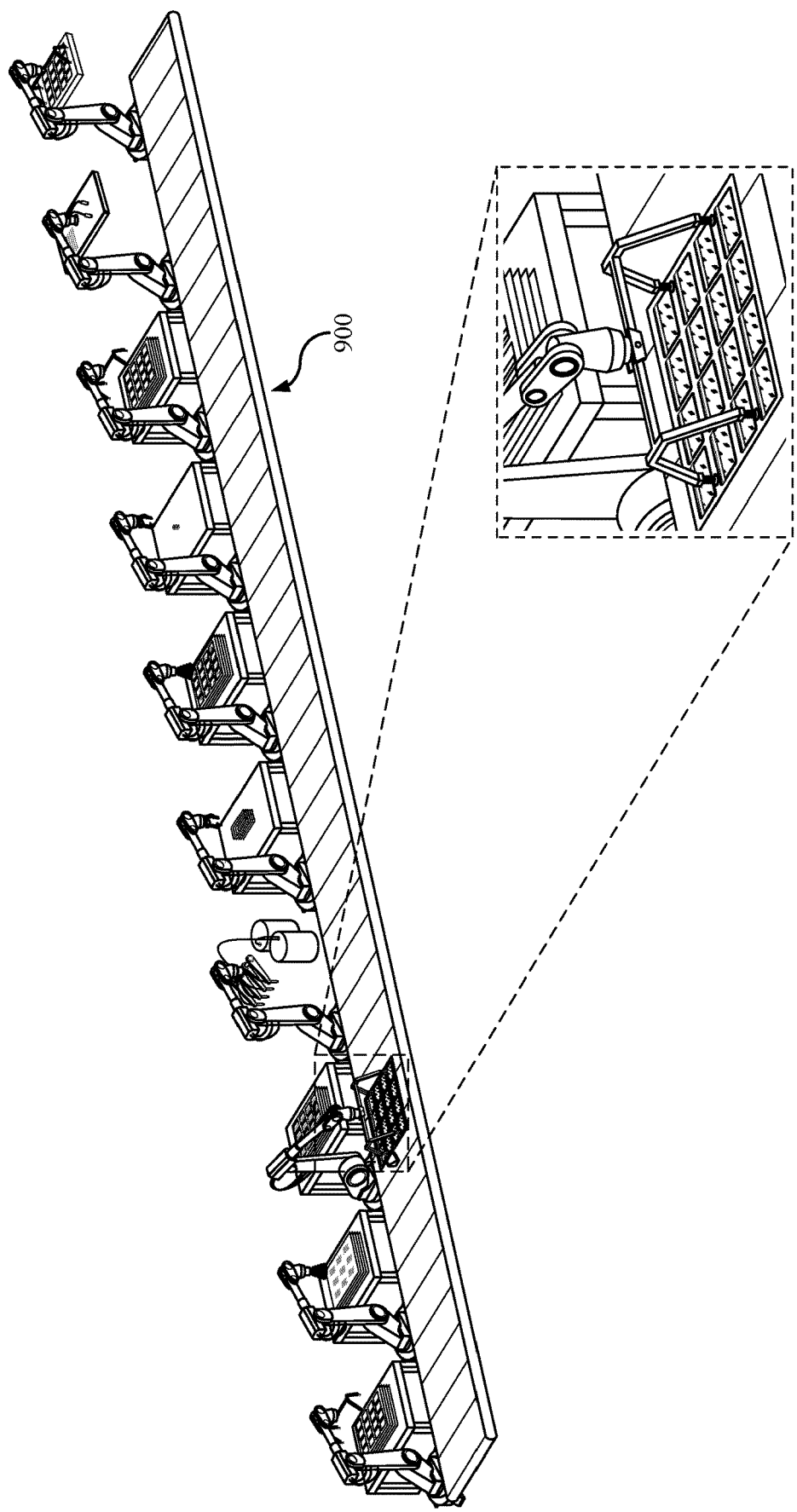

FIG. 9C illustrates an example approach for placing a magnetic stripe 113 on top of the lower rigid layer 206, as previously described at block 706 of FIG. 7. As depicted, each magnetic stripe 113 is individually placed by an industrial robot. However, other approaches could be used to apply the magnetic stripe 113, such as rollers.

Figure 9D:
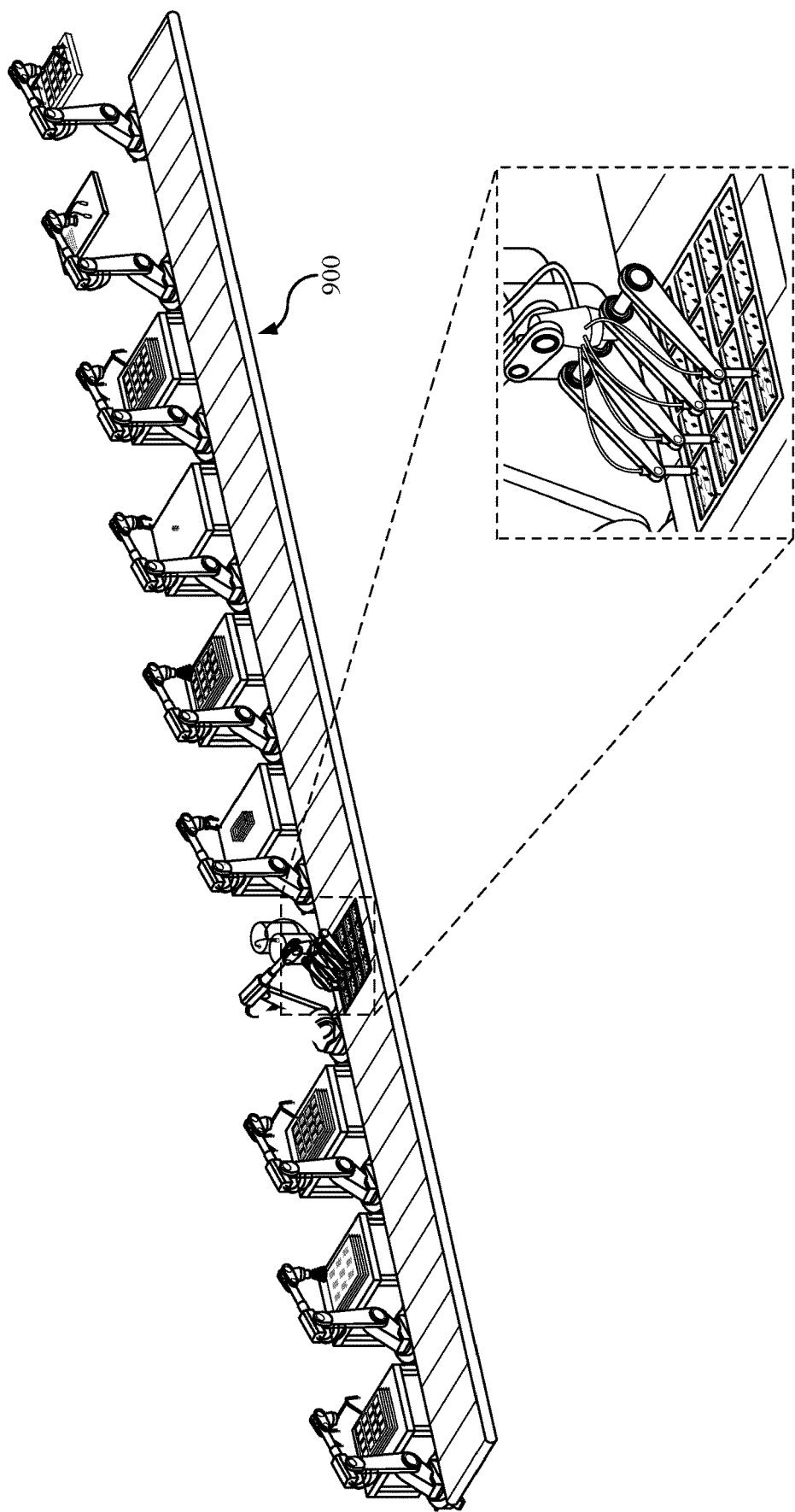

FIG. 9D illustrates an example approach for placing a binding layer 209 on top of the lower rigid layer 206 and the magnetic stripe 113, as previously described at block 709 of FIG. 7. For example, one or more drops of glue or a similar adhesive could be deposited by an industrial robot or machine, which would form the binding layer 209 as the glue or adhesive spreads under pressure. As another example, an industrial robot or machine could be used to deposit individual sheets of laminate, glue laminate, or other adhesive.

Figure 9E:
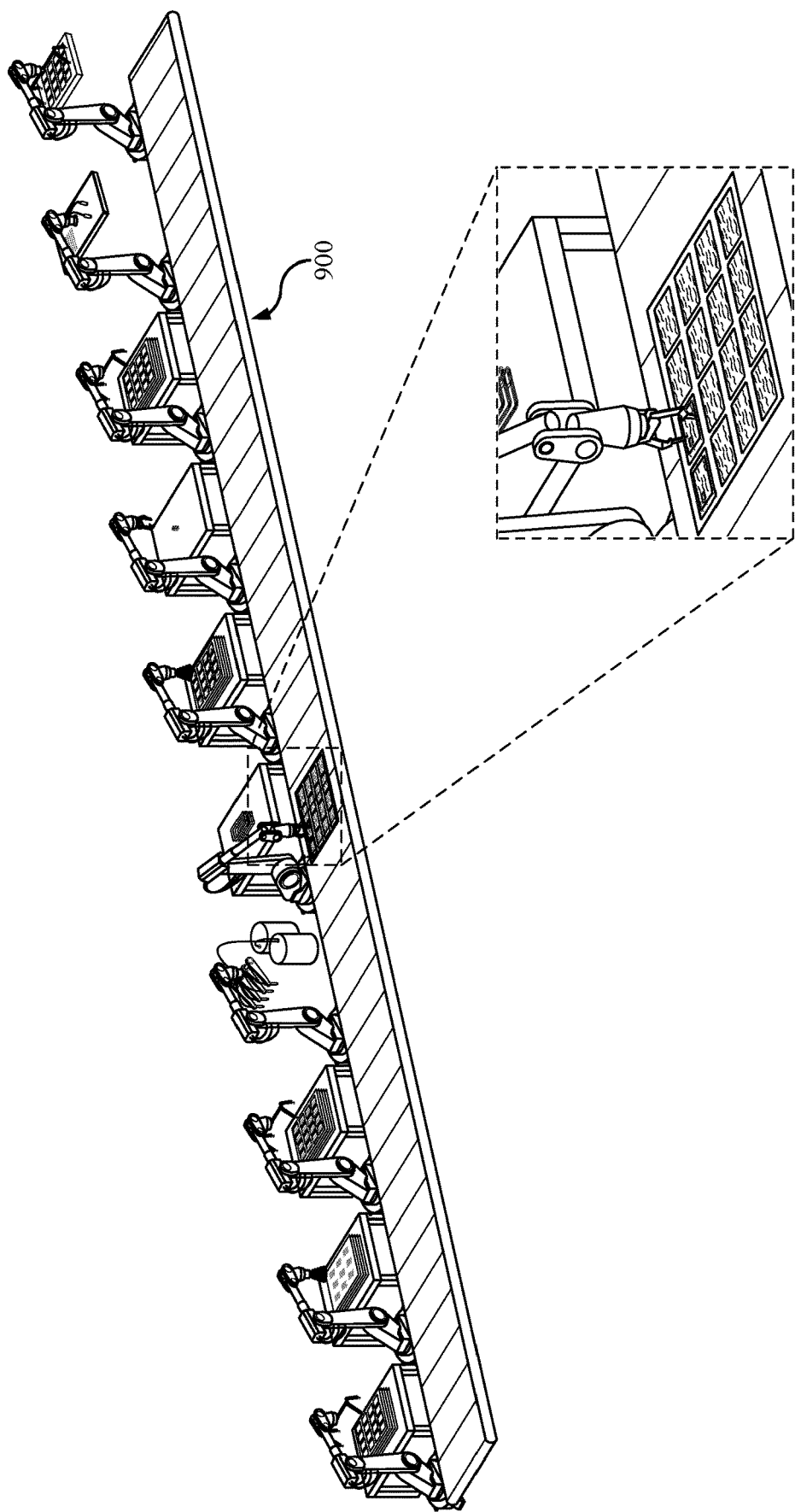

FIG. 9E illustrates an example approach for placing an antenna 106 on top of the binding layer 209, as previously described at block 713 of FIG. 7. As illustrated, an industrial robot or machine could lay an antenna 106 on top of the binding layer 209.

Figure 9F:
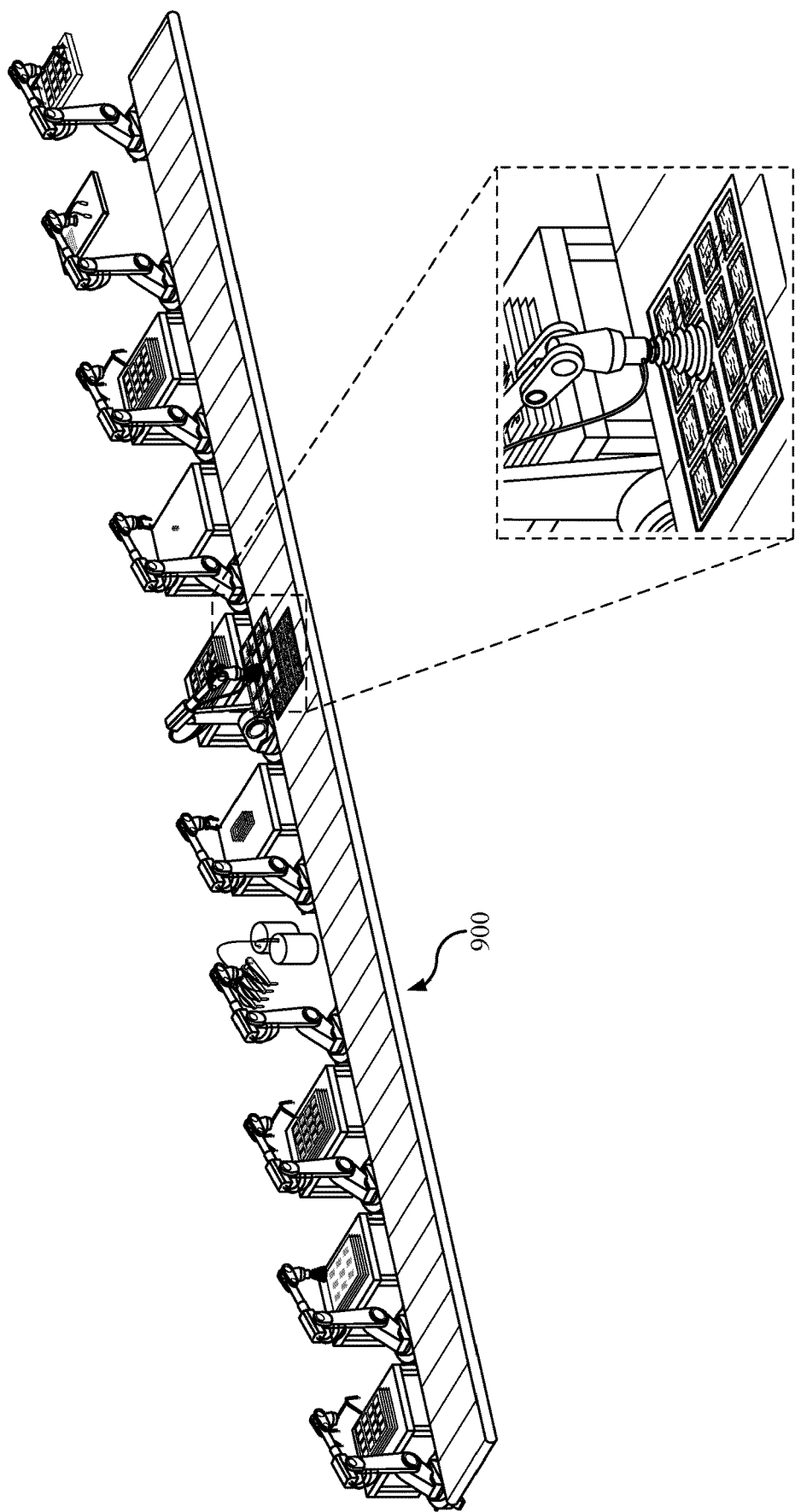

FIG. 9F illustrates an example approach for placing the upper rigid layer 203 on top of the antenna 106 and/or the binding layer 209, as previously described at block 716 of FIG. 7. As shown, an industrial robot or machine can place individual upper rigid layers 206 on top of each antenna 106 and/or binding layer 209.

Figure 9G:
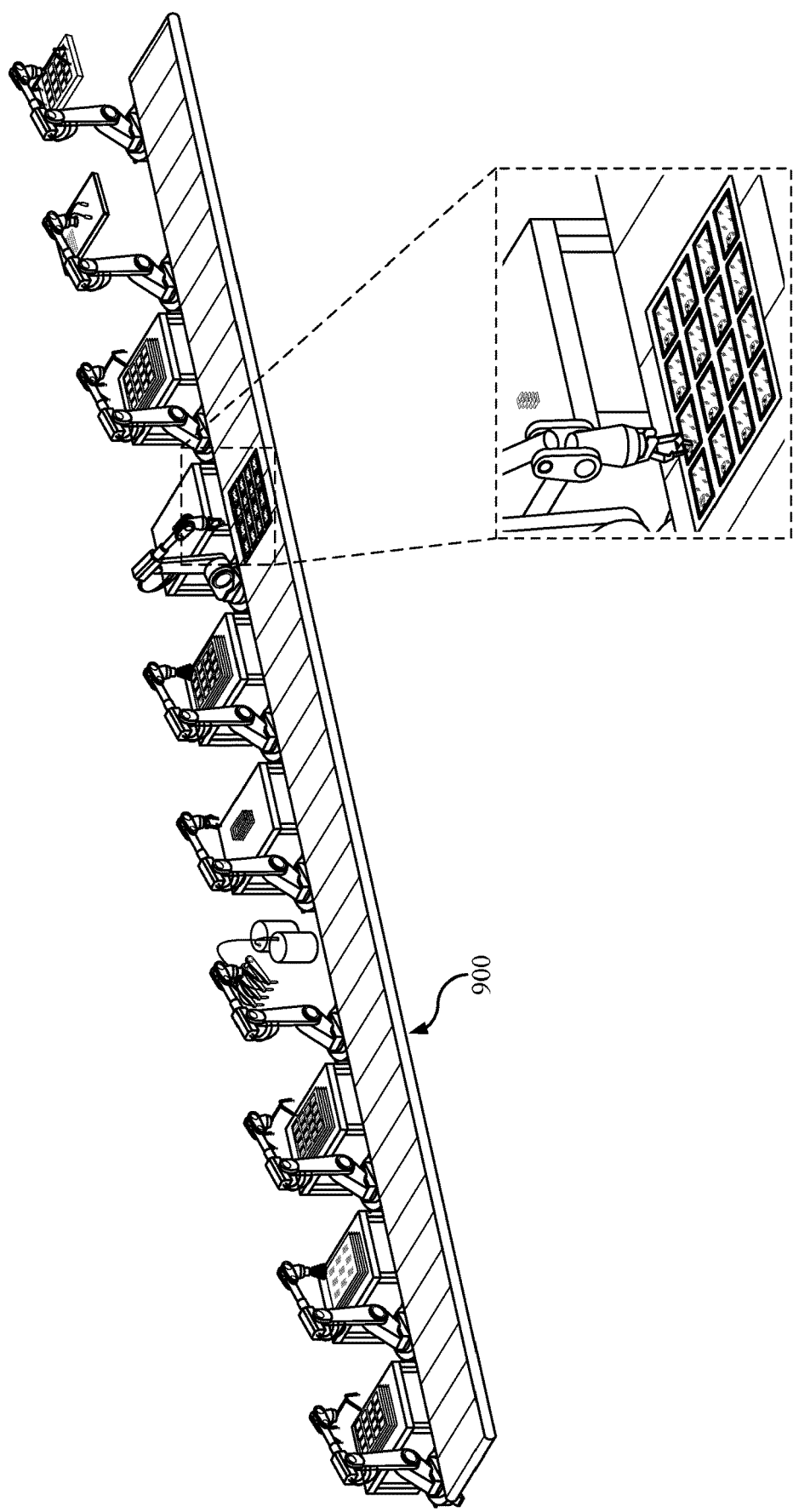

FIG. 9G illustrates an example of placing a processing chip 109 within the pocket 213 of each upper rigid layer 203, as previously described at block 719 of FIG. 7. As shown here, each processing chip 109 is placed directly within the pocket 213 by an industrial robot or machine without first depositing an adhesive within the pocket 213. This can be done if the processing chip 109 is self-adhering (e.g., because the processing chip 109 has an adhesive on its back). Additional stations along the conveyor belt 900 could be desired if an adhesive is to first be deposited within the pocket 213.

Figure 9H:
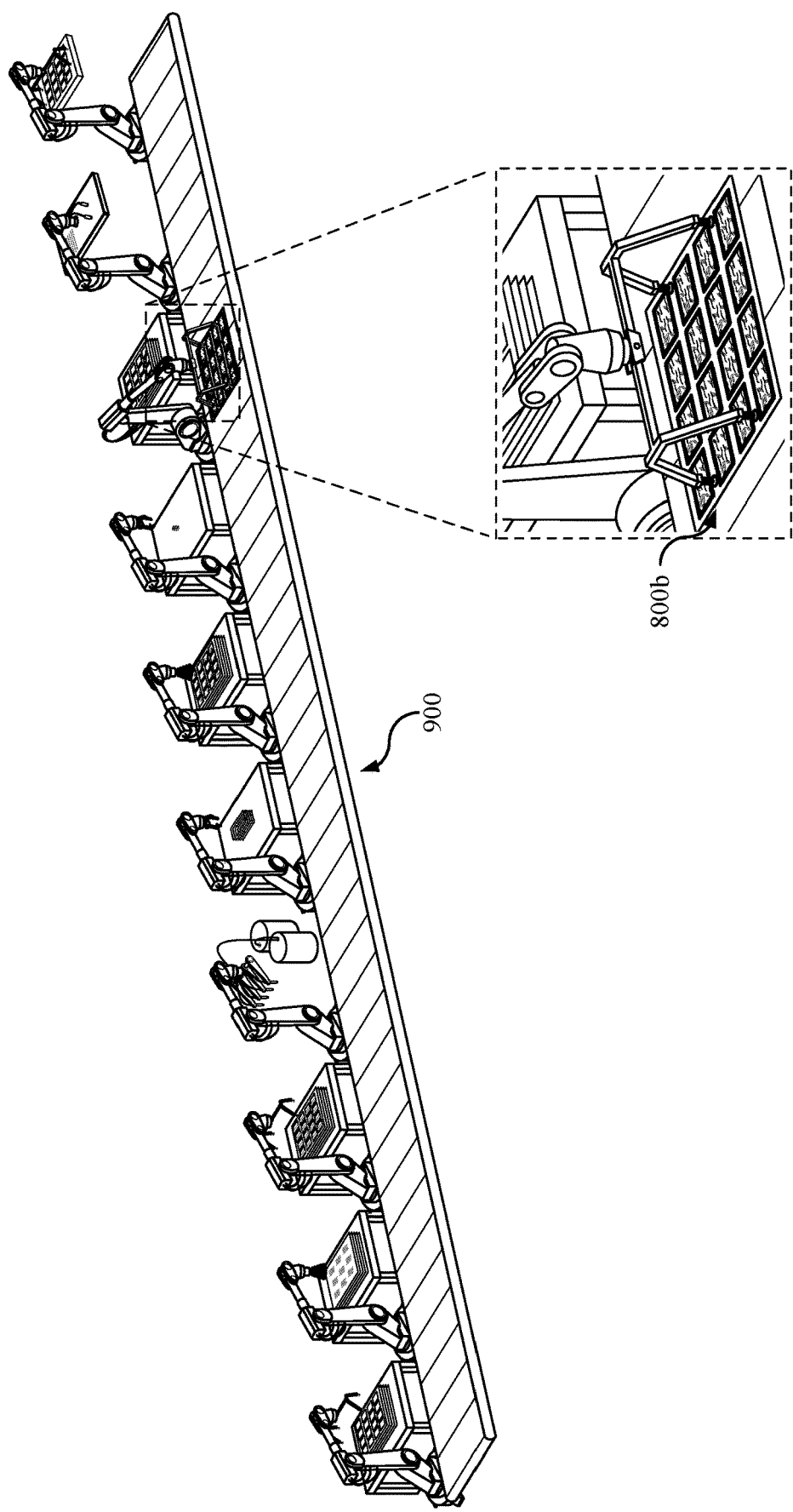

FIG. 9H illustrates an example of placing a second metallic sheet 800b on top of the first metallic sheet 800a, as previously described at block 723 of FIG. 7. As shown, an industrial robot or machine can place the second metallic sheet 800b on top of the first metallic sheet 800a the conveyor belt 900 of the assembly line.

Figure 9I:
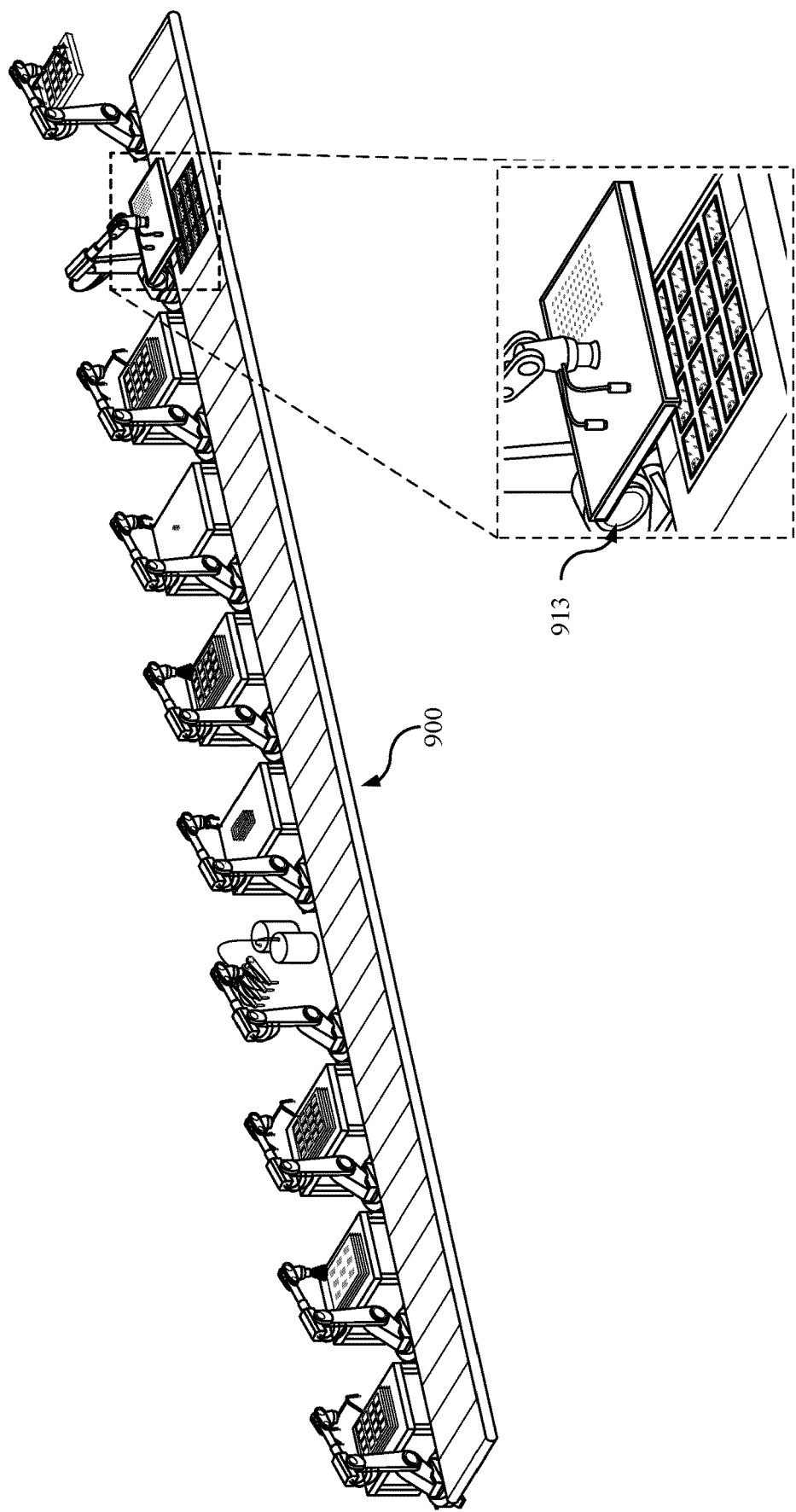

FIG. 9I illustrates an example of fusing the first metallic sheet 800a with the second metallic sheet 800b, as previously described at block 726 of FIG. 7. As shown, a heat press 903 can be used to apply heat and/or pressure to the metallic sheets 800, the upper rigid layer 203, and the lower rigid layer 206. This can cause the first metallic sheet 800a to fuse with the second metallic sheet 800b. In some implementations, this can also cause the binding medium of the binding layer 209 to adhere the first metallic sheet 800a with the second metallic sheet 800b.

Figure 9J:
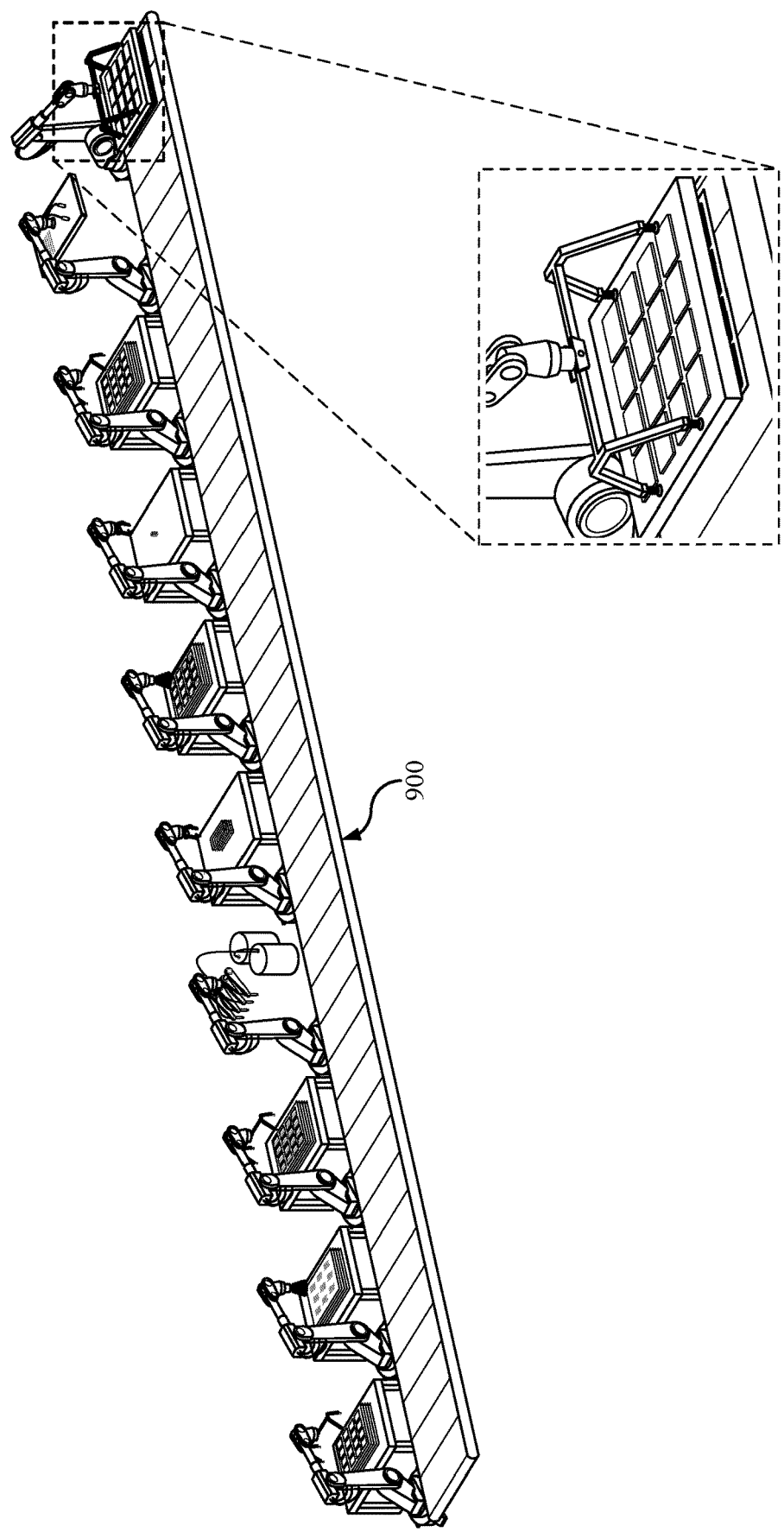

FIG. 9J illustrates an example of cutting the fused metallic sheet to remove the individual transaction cards 100, as previously described at block 729 of FIG. 7. Although FIG. 9J illustrates the use of cutout dies, other cutting tools can be used according to various embodiments of the present disclosure.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A transaction card, comprising:
    a first rigid layer having a first external surface and a first internal surface, the first rigid layer comprising a pocket within the first external surface of the first rigid layer;
    a second rigid layer having a second external surface and a second internal surface;
    a binding layer between the first rigid layer and the second rigid layer, the binding layer comprising a binding medium affixing the first internal surface of the first rigid layer to the second internal surface of the second rigid layer;
    an integrated circuit chip affixed within the pocket of the first rigid layer; and
    a metallic band extending from the first external surface of the first rigid layer around a first edge of the first rigid layer and a second edge of the second rigid layer and onto the second external surface of the second rigid layer, wherein the metallic band fails to overlap at least a portion of the first external surface of the first rigid layer and fails to overlap at least a portion of the second external surface of the second rigid layer and fails to overlap the first internal surface of the first rigid layer and fails to overlap of the second internal surface of the second rigid layer.

2. The transaction card of claim 1, further comprising a magnetic stripe attached to the second rigid layer and positioned between the first rigid layer and the second rigid layer.

3. The transaction card of claim 1, further comprising an antenna positioned between the first rigid layer and the second rigid layer, the antenna being inductively coupled to the integrated circuit chip.

4. The transaction card of claim 1, further comprising an antenna positioned between the first rigid layer and the second rigid layer, the antenna being connected to the integrated circuit chip via a contact pad.

5. The transaction card of claim 1, wherein the integrated circuit chip further comprises an antenna.

6. The transaction card of claim 1, wherein the first rigid layer and the second rigid layer comprise a chemically strengthened glass.

7. A transaction card manufactured by a process comprising:
- placing a first rigid layer of a transaction card within a first recess of a first metallic sheet, the first recess having a first lip that extends over a first exterior surface of the first rigid layer and fails to extend over a first interior surface of the first rigid layer;
- placing a binding layer on top of the first rigid layer of the transaction card, the binding layer comprising a binding medium;
- placing a second rigid layer on top of the binding layer;
- placing a second metallic sheet on top of the first metallic sheet, the second metallic sheet having a second lip that extends over a second exterior surface of the second rigid layer and fails to extend over a second interior surface of the second rigid layer; and
- fusing the first metallic sheet together with the second metallic sheet to form a fused metal sheet.

8. The transaction card manufactured by the process of claim 7, further comprising placing an antenna between the first rigid layer and the second rigid layer.

9. The transaction card manufactured by the process of claim 7, further comprising affixing an integrated circuit chip within a pocket of the second rigid layer.

10. The transaction card manufactured by the process of claim 7, further comprising cutting the fused metal sheet on a border of a second recess.

11. The transaction card manufactured by the process of claim 7, further comprising affixing a magnetic stripe to an interior surface of the first rigid layer of the transaction card.

12. The transaction card manufactured by the process of claim 7, further comprising affixing a magnetic stripe to an exterior surface of the first rigid layer.

13. The transaction card manufactured by the process of claim 7, wherein the first rigid layer and the second rigid layer comprise a chemically strengthened glass.

* * * * *